(12) United States Patent
Elgimiabi

(10) Patent No.: US 8,779,032 B2
(45) Date of Patent: Jul. 15, 2014

(54) EPOXY RESIN BASED CORE FILLER MATERIAL DEVELOPING LOW EXOTHERMIC HEAT

(75) Inventor: Sohaib Elgimiabi, Dusseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 217 days.

(21) Appl. No.: 13/258,665

(22) PCT Filed: Mar. 26, 2010

(86) PCT No.: PCT/US2010/028778
§ 371 (c)(1),
(2), (4) Date: Sep. 22, 2011

(87) PCT Pub. No.: WO2010/117669
PCT Pub. Date: Oct. 14, 2010

(65) Prior Publication Data
US 2012/0022185 A1 Jan. 26, 2012

(30) Foreign Application Priority Data
Mar. 30, 2009 (GB) .................... 0905362.0

(51) Int. Cl.
*C08G 59/42* (2006.01)
*C08G 59/58* (2006.01)
*C08L 63/00* (2006.01)

(52) U.S. Cl.
USPC ............................ 523/400; 523/440; 523/451

(58) Field of Classification Search
CPC ..... C08G 59/4284; C08G 59/58; C08L 63/00
USPC ................. 523/440, 442–444, 466, 457–459; 264/267
See application file for complete search history.

(56) References Cited

U.S. PATENT DOCUMENTS 5,679,719 A * 10/1997 Klemarczyk et al. ........... 522/13
6,635,202 B1 10/2003 Bugg et al.
2002/0006515 A1 1/2002 Luttrull
2007/0090560 A1 * 4/2007 Kassa et al. .................... 264/230
2008/0167412 A1 * 7/2008 Elgimiabi et al. ............ 524/414

FOREIGN PATENT DOCUMENTS

| CA | 2144230 | 9/1995 |
| EP | 0 671 427 A1 | 9/1995 |
| JP | H05-070564 | 3/1993 |
| JP | H07-216057 | 8/1995 |
| WO | WO 97/19124 | 5/1997 |
| WO | WO 2006/071820 A1 | 7/2006 |
| WO | WO 2010/117669 A1 | 10/2010 |

OTHER PUBLICATIONS

Joachim Klee: "Hybridnetzwerke-Möglichkeiten der Carbonsäureanhydridmodifizierung und Nachvernetzung von Eposid-Amin-Prepolymeren", Makromoi. Chem., vol. 190, No. 11, Nov. 11, 1989, pp. 2673-2681.
International Search Report, Form PCT/ISA/210, International Application No. PCT/US2010/028778, International Filing Date Mar. 26, 2010, 4 pages.

* cited by examiner

*Primary Examiner* — RAndy Gulakowski
*Assistant Examiner* — Ha Nguyen
(74) *Attorney, Agent, or Firm* — Philip Y. Dahl

(57) ABSTRACT

The present disclosure provides curable compositions such as curable compositions including: (i) at least one epoxy resin comprising at least one aromatic or aromatic-derived moiety but not containing an aromatic amine moiety; (ii) an epoxide hardener system comprising: (a) a carboxylic acid anhydride, (b) a first amine having a melting point from about 30° C. to about 100° C. and containing at least one primary amine group; and (c) a second amine having a melting point of from about 50° C. to about 180° C. and having at least one primary amine group, wherein the first and second amines have a difference in melting points of at least 10° C.; and (iii) a filler capable of reducing the density of the curable composition. Also provided are compositions obtainable by curing the curable composition and methods of using the curable composition to fill voids in honeycomb structures.

14 Claims, No Drawings

EPOXY RESIN BASED CORE FILLER MATERIAL DEVELOPING LOW EXOTHERMIC HEAT

CROSS REFERENCE TO RELATED APPLICATIONS

This application is a national stage filing under 35 U.S.C. 371 of PCT/US2010/028778, filed Mar. 26, 2010, which claims priority to Great Britain Application No. GB 0905362.0, filed 30 Mar. 2009, the disclosure of which is incorporated by reference in its/their entirety herein.

FIELD

In general, this disclosure relates to one-part epoxy resin based curable and cured filler compositions. The compositions are in particular suitable as filler material for honeycomb structures, in particular those used in aircraft, watercraft and automobiles. The curable filler compositions have improved fire resistance, and develop only little exothermic heat during the curing. The cured compositions display a good compressive strength also at elevated temperatures.

BACKGROUND ART

Transportation vehicles, such as automobiles, watercraft and aircraft, are increasingly prepared using low weight materials to reduce fuel consumption. To achieve this purpose honeycomb structures are employed to replace solid structures more and more frequently. The size of the void cells in a honeycomb structure influences the mechanical properties of the structure. The bigger the size the greater the weight reduction but the greater may be the loss of mechanical strength. Void cells in honeycomb structures may typically range from 5 mm up to 10 cm in at least one or all three dimensions. There is the desire to employ honeycomb structures with larger void cells and to find solutions to counteract the potential loss of mechanical strength. One approach is to partially or completely fill some or all of the void cells of the honeycomb structure with filler materials. Epoxy resin based compositions may be used for this purpose.

In U.S. Pat. No. 6,635,202 to Bugg and Hayes, a thermally foaming powder is disclosed that can be used as filler in honeycomb panels. The thermally foaming powder contains Araldite GY260 (a bisphenol A epoxy resin), dicyandiamide, chlorotoluron, 3,3'-dimethyl 4,4, diamine dicyclohexyl methane, Expancel 551 DU (unexpanded micro-spheres), and Cabosil TS720. The powdery precursor is obtained by mixing the starting compounds at temperatures below the onset temperature of the epoxy compound and below the temperature where expansion of the unexpanded thermoplastic microspheres occurs.

The powders are filled in a honeycomb structure and heated thereby expanding, foaming and curing the powder. The powders of U.S. Pat. No. '202 may not be easily used in vertical bonding geometries, which limits their applicability.

Moreover, when using curable epoxy resins as core fillers the curing reaction is typically exothermic. Generally, this is not a problem in standard applications of curable epoxy resin formulations where the epoxy resins are used to bond components together. In such applications curable epoxy resin compositions are typically applied as thin layers between the substrates to be joined and bonded. However, the exothermic reaction may become noticeable when curing thick layers of epoxy resins as may be the case when using curable epoxy resins as filler materials, for example, in honeycomb structures. Due to the comparatively large size of the cells, the epoxy resin compositions may have to be applied in a thickness of greater than 30 or even greater than 50 mm. Heat generated by the exothermic curing reaction of substantial amounts of epoxy resins may thermally damage the epoxy resin composition and impact on its mechanical properties. It may also affect the honeycomb structure or components attached to the honeycomb structure. Therefore, there is a need for providing curable epoxy resin compositions that develop little exothermic heat during the curing reaction.

In international patent application WO 2006/071820 an epoxy-based filler composition is disclosed. WO 2006/071820 teaches to avoid amine based hardeners for overcoming exothermic heat generation upon curing the epoxy composition.

In addition to overcoming the problem of heat generation, curable filler compositions are also desired that can be cured to provide compositions having good compressive strength not only at room temperature but also at elevated temperatures, such as for example 135° C. or even at 150° C.

Furthermore, the curable filler compositions desirably are extrudable pastes to allow easy application to honeycomb structures.

Finally, curable filler compositions are desired that have in addition to the properties mentioned above a good shelf-life at room temperature.

SUMMARY

In the following there is provided a curable composition comprising
(i) at least one epoxy resin comprising at least one aromatic moiety or a cyclic moiety derivable by hydrogenating an aromatic moiety and wherein the epoxy resin does not contain an aromatic amine moiety,
(ii) an epoxide hardener system comprising
   (a) a carboxylic acid anhydride,
   (b) a first amine having a melting point from about 30° C. to about 100° C. and containing at least one primary amine group; and
   (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride;
(iii) a filler capable of reducing the density of the curable composition.

There is also provided a cured composition comprising
(i) the reaction product of an epoxy resin and an epoxide hardener system, where the epoxy resin comprises at least one aromatic moiety or a cyclic moiety derivable by hydrogenating an aromatic moiety and wherein the epoxy resin does not contain an aromatic amine moiety, and wherein the epoxide hardener system comprises
   (a) a carboxylic acid anhydride,
   (b) a first amine having a melting point from about 30° C. to about 100° C. and containing at least one primary amine group; and
   (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride;

and wherein the composition further comprises
(ii) a filler capable of reducing the density of the curable composition and, optionally,
(iii) a fire-retardant system that includes a mixture of:
(a) at least one compound selected from the group comprising alkaline earth metal hydroxides and aluminium group hydroxides, and
(b) at least one phosphorous-containing material.

In a further aspect there is provided a process for filling cells of a honeycomb structure comprising applying a curable composition as above to the honeycomb structure and curing the composition.

In yet another aspect there is provided the use of the curable composition described above for filling cells of a honeycomb structure.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The terms "solid" and "liquid" refer to ambient conditions (23° C., 1 bar).

Average particle sizes as referred to herein are number averages. In case of particles that are only substantially spherical the particle size is determined by adding the length of the two main (largest orthogonal) axes of the particle and dividing it by two. "Substantially spherical" means one or all main axes (x-, y- or z-axis) may deviate from the required length to form a perfect sphere by up to 50%, preferably up to 25%.

The curable compositions provided herein, preferably, are extrudable pastes. As used above and below, the term "extrudable paste" refers to compositions which have an initial extrusion rate measured as described in the test section below which is at least 50 g/min. More preferably, the initial extrusion rate is from 50 g/min up to 300 g/min.

The curable and cured compositions comprise:
at least one organic epoxide compound,
an epoxide hardener system comprising
(a) a carboxylic acid anhydride,
(b) a first amine as described below,
(c) a second amine as described below
and a filler.

To make the composition fire-retardant, the compositions may further include a fire-retardant system that includes a mixture of:
(a) at least one compound selected from the group comprising alkaline earth metal hydroxides and aluminium group hydroxides, and
(b) at least one phosphorous-containing material.

Organic Epoxides:

Organic epoxides as used herein are epoxy resins. Epoxy resins are polymeric organic compounds having one or more oxirane ring polymerizable by a ring opening reaction. The epoxy-functionalities allow the resin to undertake cross-linking reactions. Such materials, broadly called epoxides, can be cycloaliphatic or aromatic, which means they have one or more unit that is cycloaliphatic or aromatic. Useful materials generally have at least two polymerizable epoxy groups per molecule and, more preferably, from two to four polymerizable epoxy groups per molecule. Typically, the epoxy resins may have an average epoxy-functionality of at least 1, greater than one, or of at least 2, or from about 1 to 4.

The epoxy resin is preferably free or essentially free of aromatic amine moieties. The term "essentially free" as used herein means that trace amounts may be present, for example, due to impurities present in the starting materials or as a result of production process. Such trace amounts include less than 10,000 ppm, preferably less than 5,000 ppm, based on the total amount of the composition.

Typically but not exclusively, the epoxy resins contain repeating units derived from monomers having an epoxy-functionality as described above but epoxy resins can also include, for example, silicone-based polymers that contain epoxy groups or organic polymer particles coated with or modified with epoxy groups or particles coated with, dispersed in, or modified with epoxy-groups-containing polymers.

Mixtures of various epoxy resins may also be used in the compositions of the invention. Epoxy resins may be selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof.

Preferably, the epoxy resins contain moieties of the glycidyl, diglycidyl or polyglycidyl ether type. Such epoxy resins may be obtained, for example, by the reaction of a hydroxyl functionality (for example but not limited to dihydric or polyhydric phenols or aliphatic alcohols including polyols) with an epichlorohydrine-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of monohydric, dihydric or polyhydric phenols, such as for example, but not limited to bisphenol A, bisphenol F, including polymers comprising repeating units of these phenols. Preferred epoxy resins include epoxy novolacs. Epoxy novolacs are the reaction product of an epoxy group-introducing agent, such as for example epichlorohydrin, with a condensation product of a mono- di or polyhydric phenol (which may be alkylsubstituted (e.g. cresol) or non-substituted) and an aldehyde, such as for example, formaldehyde. Typical epoxy novolacs are polymers containing glycidyl ether groups and further comprising repeating units derived from bisphenol F or another reaction product of a phenol with an aldehyde. The phenol may be monohydric, dihydric or trihyidric and may be non-substituted or alkyl substituted.

Instead of, or in addition to, the aromatic epoxy resins described above also their fully or partially hydrogenated derivatives (i.e. the corresponding cycloaliphatic compounds) may be used.

The epoxy resins may be liquid at room temperature or solid. Typically the epoxy resins may have a viscosity of from about 400 mPa·s at 20° C. to about 40,000 mPa·s at 50° C. Preferably, the resin has a viscosity of at least 8,000 mPa s at 20° C. up to 5,000 mPa s at 50° C.

The epoxy resin preferably does not contain an —$NH_2$ or —$NH_3^+$ functionality.

More preferably, the epoxy resin preferably does not contain an aromatic amine moiety, such as for example a unit derived from an aminophenol.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co,); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany), or EPILOX (Leuna Epilox GmbH, Leuna, Germany). Epoxy novolacs are available under the trade designation D.E.N. from Dow Chemical Co, Schwalbach/Ts., Germany, such as for example D.E.N 431 (a novolac resin with an average epoxy functionality of 2.8 and a viscosity of from 1100 to 1700 mPa s at 51.7° C.), D.E.N. 425 a novolac resin with an average epoxy functionality of 2.5 and a viscosity of from 9500 to 12500 mPa s at 25° C., D.E.N. 438 a novolac resin with an average epoxy functionality of 3.6 and a viscosity of from 3100 to 4000 mPa s at 51.7° C.

Typically, the compositions provided herein comprise 10 to 70 percent by weight, preferably from 15 to 60 percent by weight, more preferably from 15 to 55 percent by weight and especially preferably from 15 to 50 percent by weight of one or more epoxy resin.

Epoxy-Hardener System:

The compositions further contain a system of epoxy hardeners. Epoxide hardeners are compounds that react with the oxirane ring of the epoxide to cause cross-linking. Epoxide hardeners are known in the art also as curing agents and accelerators. In the art, the term "curing agent" often denotes an epoxy hardener that is predominantly used to carry out the cross-linking agent, i.e. it is present in the hardening system as the major component (i.e. in major amounts). The term "accelerating agent" has been used in the art for compounds that are also able to cross-link epoxides but that are present in smaller amounts than the curing agents, such that the cross-linking network predominantly contains units derived from the curing agent as compared to units derived from the accelerating agent. Typical accelerators known in the art include boron trifluoride or trichloride amine complexes, imidazoles, imidazole derivatives, imidazole-like compounds and the like. Specific examples include, for example, 2-(2-(2 methylimidazolyl)-ethyl)-4,6-diamino-s-triazine.

In the present specification, no differentiation is made between hardeners and accelerators.

The curable compositions according to the invention include the following epoxy hardeners: one or more carboxylic acid anhydrides, a first amine and a second amine, wherein the first amine is an amine having a melting point of from about 30° C. up to 180° C., and the second amine is an amine having a melting point of from about 40° C. up to about 190° C. Preferably, the first and second amines are chosen such that they have a difference in melting points of at least 10° C. The anhydrides, the first amines and the second amines are all capable of reacting with the epoxide groups of the resin by way of a cross-linking reaction. The individual components of the epoxy hardener system are described in greater detail below.

Anhydrides:

Carboxylic acid anhydrides are known hardeners in the field of epoxy resin-based curable compositions. Typical carboxylic acid anhydrides include, but are not limited to, phthalic acid anhydrides, such as, for example, tetrahydroxy phthalic acid anhydrides or norbornenephthalic acid anhydrides.

The amounts of anhydrides to epoxy resin are chosen such that they have about equal equivalent weights, i.e. the molar amounts of reactive anhydride groups to reactive epoxy groups is about 1:1 or from 0.8:1 to about 1:0.8.

First Amines:

The first amines used in the epoxy hardener system are amines having a melting point of from about 30° C. up to about 100° C., preferably from about 40° C. up to about 90° C., more preferably from about 60° C. to about 80° C. The first amines are preferably aliphatic amines, meaning they do not contain an aromatic residue. The first amines preferably contain at least one primary amine residue (i.e. an —$NH_2$ residue). The first amines may be linear or branched, cyclic or acyclic.

The first amines may be linear or branched amines of the general structure:

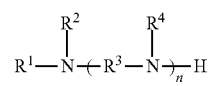

wherein
the residues $R^1$, $R^2$, and $R^4$, independently from each other, may represent hydrogen or a hydrocarbon (such as an alkyl) or an alkoxy or a polyoxyalkyl residue. $R^3$ represents a hydrocarbon, an alkylether or a polyether alkyl residue. More preferably $R^3$ is a polyetheralkyl residue. Preferably, the residues $R^1$, $R^2$, and $R^4$ are chosen such that the amine contains at least one or two primary amine groups;
n represents an integer.

Suitable polyether amines include those that can be derived from polypropylene oxide or polyethylene oxide.

The residues and integers are chosen such that the amine has a melting point within the range as described above. First amines as described above are commercially available, for example, within the JEFFAMINE series from Huntsman Chemicals, or within the ANCAMINE series from Airproducts.

Second Amines:

The second amines are amines having a melting point of from about 50° C. up to about 180° C., preferably from about 70° C. to less than about 150° C., more preferably from about greater than 80° C. to less than about 129° C. The second amines may be of the same or different chemical type than the first amines. Preferably, the second amines are aliphatic, more preferably, cycloaliphatic (which means they do contain aliphatic or cycloaliphatic moieties but do not contain aromatic moieties). The cycloaliphatic amines as used herein mean that the amine contains one or more than one cycloaliphatic residues. The cycloaliphatic amines are preferably primary amines and contain at least one primary amine group. Typical examples of cycloaliphatic amines include primary amines containing one or two or more than two cyclic residues (such as, for example, cyclohexyl, cycloheptyl, or cyclopentyl residues or combinations thereof).

The compositions as provided herein may typically comprise from about 10 to about 40% weight based on the weight of the total composition of hardeners. Typically, the second amines are used in equal amount or in excess with respect to the first amines. Typically, the first and second amines are used in minor amounts compared to the anhydrides, such as for example from 0.5 to 20% or from 1 to 12% by weight based on the total amount of anhydrides used in the hardening system, or based on the total amount of hardeners used in the composition.

The first and second amines are chosen such that they have a difference in melting points of at least 10° C.

The curing system is preferably selected such that the precursor can be cured by subjecting it to a temperature between 120° C. and 180° C.

It was found by the inventors that a good balance between processing properties (e.g. preferably paste-like consistency), mechanical strength at ambient and elevated temperatures, as measured as compressive strength at 23° and 135° C., low exothermic heat released upon curing and long shelf-life at room temperature as measured by the extrusion rate after 5 days can be obtained by the epoxy resin and the hardener system described above. Replacing one or more of these ingredients might influence the above described properties significantly.

To make the above compositions more fire retardant, the compositions may further comprise a fire retardant system as described below.

To make the above compositions more light weight, the compositions may further comprise a filler material as described below.

Filler:

The compositions may further comprise a filler capable of reducing the density of the composition. Capable of reducing the density of the composition as used herein means the filler has a lower density than the composition without the filler. Typically, the compositions may comprise 15 to 60 weight percent of such a filler. Fillers capable of reducing the density of the precursor includes low density inorganic fillers, (i.e., fillers having a density of between 0.1 to 0.5 g/cm$^3$), low density organic fillers (i.e., fillers having a density of between 0.01 to 0.30 g/cm$^3$) but low density inorganic fillers are preferred over organic fillers because the letter tend to negatively influence the compressive strength. A combination of organic and inorganic fillers may be used but the inorganic low density fillers are preferably used in excess over the organic fillers.

The low-density inorganic fillers are preferably selected from inorganic particles, inorganic microspheres and in particular hollow inorganic microspheres. The microspheres may be selected from a variety of materials including by way of example glass, silica, ceramic (including sol-gel derived) or zirconia.

The fillers are preferably selected so that they allow for an advantageous density of the cured composition without sacrificing its compressive strength. The hollow inorganic microspheres exhibit a density of less than 0.5 g/cm$^3$, more preferably of between 0.12 and 0.42 g/cm$^3$. The fillers may have an average particle size typically of less than 500 μm, or between 10 and 100 μm.

Preferred hollow inorganic microspheres include glass microspheres which are commercially available, for example, from 3M Company under the trade designation Glass bubbles D32 or Scotchlite D32/4500.

Unexpanded organic hollow microsphere fillers are available, for example, from Akzo Nobel under the trade designation "Expancel®". Unexpanded organic hollow microspheres are sometimes also referred to as expandable organic microballoons which are also available, for example, from Lehmann and Voss, Hamburg, Germany under the trade designation Micropearl. Pre-expanded organic hollow microspheres are commercially available, for example, from Lehmann & Voss, Hamburg, Germany under the trade designation Dualite.

The concentration and the nature of the fillers used in the curable compositions is preferably selected such that the density of the cured composition is less than 1 g/cm$^3$, more preferably less than 0.9 g/cm$^3$ and most preferably between 0.5 and 0.8 g/cm$^3$.

Fire Retardant System:

The precursors and cured compositions of the present invention may further comprise a fire-retardant system that includes a mixture of: (1) at least one compound selected from the group comprising alkaline earth metal hydroxides and aluminium group hydroxides, and (2) at least one phosphorous-containing material.

The precursors and cured compositions typically comprise the fire-retardant system of (1) and (2) above from 5 to 50 weight percent and preferably from 10 to 50 weight percent based on the total composition.

The compounds of group (1) comprising alkaline earth metal hydroxides and aluminium group hydroxides are often referred to as smoke suppressants. Especially preferred compounds include aluminium trihydrate (=aluminium oxide trihydrate, sometimes also referred to as aluminium hydroxide) and magnesium hydroxide.

The phosphorous-containing material (2) may be selected from a group comprising, for example, elemental red phosphorous, melamine phosphate, dimelamine phosphate, melamine pyrophosphate and inorganic phosphinates such as, for example, aluminium phosphinates. Elemental red phosphorous and inorganic phosphinates are preferred. The fire-resistant system may also include an optional boron-containing material, such as those selected from the group consisting of barium metaborates, calcium metaborates, zinc metaborates and mixtures thereof. These materials may provide up to 25 weight percent with respect to the mass of the precursor.

The composition of the present invention may comprise further ingredients, adjuvants, which may be used to further regulate rheological properties or mechanical properties, adapt the visual appearance of the compositions or may help to prevent premature degradation of the compositions. These additional materials include, for example, fillers other than those described above, thixotropic agents, reactive diluents, pigments, antioxidants, adhesion promoters and the like.

Reactive diluents and thixotropic agents may be added to control the flow characteristics of the adhesive composition.

Thixotropic agents typically are particulate materials having particle sizes of less than 50 nm. Preferred thixotropic agents include fumed silica. Thixotropic agents are commercially available under the trade designation Cab-O-Sil from Cabot, Schwalbach im Taunus, Germany, or Aerosil from Degussa Evonik GmbH, Frankfurt, Germany.

Reactive diluents are typically monomeric epoxy-containing molecules. Preferably, they have a saturated or unsaturated cyclic backbone. Preferred reactive terminal ether portions include glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane.

Further materials include wetting agents, which are preferably selected from the group consisting of titanates, silanes, zirconates, zircoaluminates, phosphoric ester(s) and mixtures thereof. The wetting agent improves the mixability and processability of the composition and can also enhance the composition's handling characteristics. An especially useful wetting agent is commercially available as Coatex DO-UP6L from Coatex, Genay, France. The concentration of the wetting agent component comprising one or more wetting agents is typically lower than 6 percent by weight and more preferably not more than 5 percent by weight.

Pigments may include inorganic or organic pigments including ferric oxide, brick dust, carbon black, titanium oxide and the like.

The compositions may further comprise toughening agents. Toughening agents are polymers, other than the epoxy resins, capable of increasing the toughness of cured epoxy resins compared to the same composition not containing them (the difference in amount in such comparison studies is made up by the epoxy resin) and which are otherwise treated identically. Typical toughening agents include, for example, core-shell polymers or liquid butadiene-nitrile rubbers.

The curable compositions of the invention can be readily prepared by a number of techniques. For example, the various components may be added under ambient conditions to a suitable mixing vessel, such as a Mogul mixer. The vessel is preferably cooled to prevent reaction of the components during preparation and to facilitate removal of any heat generated during manufacture. Preferably the curable composition (also referred to herein as "precursor") is mixed at a temperature of less than 35° C.

Additionally, slow mixing speeds are generally used to help prevent heat build-up in the mixer. Mixing is continued until the components form a homogeneous mixture, after which time the precursor is removed from the mixer.

The precursors can be applied by conventional application equipment such as extruders or equipment providing pumps. The precursors of the present invention preferably are one-part compositions, i.e. they already comprise the hardener component as compared to two-part composition, where the hardening components are kept separated from the epoxy resin until use of the compositions. One-part precursors of the present invention preferably exhibit a good shelf life time at room temperature. One-part compositions contain a reactive system and are therefore, preferably kept at low temperatures for storage. A good shelf life at room temperature as referred to herein can be determined by measuring the time (from preparing the composition or from the time it has reached room temperature (20° C.) after having been kept at −73° C.) until the composition thickens such that it becomes more difficult or impossible to extrude. A slow rate of thickening is acceptable. A composition is considered to have a good shelf life at room temperature, if its extrusion rate (as measured according to the methods described below) is greater than 60 g/min after storage for 5 days at room temperature.

The curable compositions can be applied to various substrates such as, for example, metals (for example, Al, Al alloys, titanium or stainless steel) or other substrates comprising, for example, glass, boron, carbon, Kevlar fibers, epoxy, phenols, cyanate esters and polyester matrices.

The curable compositions may be applied, for example, as a thin coating but are preferably used for the preparation of bulky articles like, for example, filled honeycomb panels for the construction of composite floor panels or walls used in watercraft or aircrafts.

The precursor compositions are subsequently cured, preferably by thermal curing. The curing conditions can be widely varied depending on the specific application. The curing temperature is typically chosen between 80 and 180° C., preferably at 175° C. and the curing time typically amounts to between 15 and 180 minutes, preferably 2 hours. Preferably, the compositions can be cured at 175° C. for a curing time of 120 minutes. Curing can be determined by testing the compositions for the mechanical properties described herein.

The curable epoxy-based compositions can be prepared the exhibit a good processability and exhibit both an advantageous initial viscosity (evaluated, for example, in terms of initial extrusion rate) and a low increase of viscosity with time (evaluated, for example, in terms of initial extrusion rate and extrusion rates after 3 days or 5 days, respectively, as described in the methods below).

The curable epoxy-based compositions can be prepared that exhibit low exothermicity upon curing (evaluated, for example, in terms maximum exothermic peak during the curing reaction according to the method described below). Compositions are considered to have a low exothermicity if their exothermicity is less than 60° C., preferably less than 55° C.

Epoxy-based compositions which are obtainable by curing the corresponding curable precursors compositions can be prepared that exhibit advantageous mechanical properties evaluated, for example, in terms of compressive strength. In particular the cured compositions have good compressive strength at room temperature but also at elevated temperatures.

The precursor compositions contain the above-mentioned ingredients in such amounts that upon curing the desired chemical and mechanical properties will be achieved. By using the above-mentioned ingredients curable compositions having one or more or all of the following properties can be prepared:
a) curable compositions having an initial extrusion rate measured as described in the method section below of between from 50 g/min to about 300 g/min;
b) curable compositions having an initial extrusion rate measured as described in the method section below after 3 days storage at room temperature of from about 50 g/min up to about 200 g/min and after 5 days storage at room temperature of from about 50 g/min and up to 150 g/min;

c) curable compositions having an exothermic peak of less than 60° C. measured as described in the method section below;
d) curable compositions that when cured have a compressive strength of at least 25 MPa at 135° C.
e) curable compositions that when cured have a compressive strength of at least 20 MPa at 150° C.
f) curable compositions that when cured have a compressive strength of at least 60 MPa at 23° C.
g) curable compositions having properties a) and b) or a), b) and c), or a), b), c), and d), or a), b), c), d) and e) or a), b), c), d), e), f) and g).

Furthermore, curable compositions further containing the fire retardant system as described above can be prepared that exhibit when cured a burn length of less than 200 mm, an after flame time of less than 15 s, an after flame drip of less than 5 s at a vertical Bunsen burner at 12 s as measured as described below.

Furthermore, curable compositions further containing the fire retardant system as described above can be prepared that exhibit when cured a burn length of less than 150 mm, an after flame time of less than 15 s, an after flame drip of less than 3 s at a vertical Bunsen burner at 60 s as measured according to the methods described below.

Furthermore, curable compositions further containing the fire retardant system as described above can be prepared that when cured exhibit an optical smoke density as measured according to the methods described below of less than 200.

The curable precursor and the cured compositions of the present invention are, in particular, useful as filler or bonding material in aircrafts because they are easily applicable, lightweight and fire-resistant materials which are capable of withstanding the forces encountered when used at the interface of a pressurized and non-pressurized zone.

The curable compositions are particular useful as filler for honeycomb structures because of their low exothermicity and mechanical strength.

A particularly preferred precursor composition comprises about 10 to 70% by weight of the organic epoxide, about 1 to 55% by weight of the epoxide hardener system, about 5 to 50% by weight of the fire retardant system and about 10 to 60% by weight of the filler capable of reducing the weight of the composition, wherein the percentages by weight are based on the total amount of the composition and the total amount of the weight percentages gives 100%.

The invention is furthermore illustrated by the examples described below. Prior to that some test methods used to characterize the precursors and cured epoxy-based composition will be described. Unless specified otherwise, percentages are percentages by weight with respect to the mass of the precursor or the cured epoxy-based composition, respectively. Above and below, the mass percentages of all components of a precursor or a cured composition, respectively, add up in each case to 100 weight percent.

Extrusion Rate

The processability of the precursor of the low-density epoxy-based composition was evaluated at room temperature (23° C.) by extruding it through standard equipment using the following procedure. An air driven application pistol (available from SEMCO, East Kilbride, U.K) was fitted with a 150 ml disposable cartridge and a nozzle having an aperture of 6.35 mm. The disposable cartridge was filled with precursor and by applying an air pressure of 5 bars the low-density epoxy composition was extruded. The extrusion rate was determined by measuring the quantity extruded in 60 seconds.

Measurements were made immediately after the precursor was prepared (initial extrusion rate). Each precursor was evaluated 3 times and the results averaged.

Additional measurements were done after the precursor was kept 3 days (or 5 days, respectively) at a temperature of 23 (±2)° C. and 50% relative humidity. The test results provided below are averages from three measurements.

Compressive Strength 200 g of the precursor were cast into a release-coated mould having the dimensions of 12.5 mm (height)×12.5 mm (width)×25 mm (length) and being open on one major side. The mould was placed in a forced air oven and subjected to a curing program comprising two curing cycles. For the first curing cycle the oven temperature was raised from 23° C. to 125° C. using a heating rate of 3° C./min. Then the temperature was held at 125° C. for 1 hour and then the temperature was cooled down to 23° C. over a period of 45 minutes.

For the second curing cycle the oven temperature was raised from 23° C. to 175° C. using a heating rate of 3° C./min. Then the temperature was held at 175° C. for 1 hour and then temperature was cooled down to 23° C. over a period of 45 minutes.

All test specimens were compressed along their 25 mm axis at a rate of 0.5 mm/min by using a Zwick Model Z030 Tensile Tester (Zwick GmbH & CO., Ulm, Germany), equipped with heating capability.

Compressive strength was measured at 23° C. (room temperature), 80° C., 120° C. and 135° C. The test specimens were preconditioned in the heated equipment for at least 30 minutes before testing at 80°, 120° C. and 135° C.

Three samples were measured for each epoxy composition. The results were averaged and recorded in MPa.

Optical Smoke Density

A sheet having a thickness of 3-5 mm was prepared by pouring the composition into an aluminium release-treated mould and curing it in an air forced oven using the same curing cycle from 23° C. to 125° C. as described previously for the compressive strength test. Samples having the dimensions of 3 mm×75 mm×75 mm were then cut from this large sheet. The surface of one side was abraded with sandpaper to insure that the exposed resin was representative of the overall composition.

The NBS smoke density chamber (NBS=National Bureau of Standards) was used to measure smoke density. This test method is described in detail in JAR/FAR Part 25, amdt. 25-66, Appendix F, Part V (JAR/FAR=Joint Aviation Requirements/Federal Aviation Regulations); see also Airbus Directive ABD 0031, "Fireworthiness Requirements, Pressurised Section of Fuselage", Issue D, September 2002, section 5.4 "smoke-density". A sample of the epoxy-based composition was placed over a gas flame of specific dimension. Smoke generated in the chamber was measured by light transmission of a vertical light beam through the air space in the oven.

Three samples of each epoxy-based composition were tested and the results averaged.

Vertical Burn Test

The vertical burn test was performed according to Airbus Directive ABD 0031, Issue September 2002. Three test specimens with a dimension of 3 mm×75 mm×300 mm were cut off a 3 mm×400 mm×400 mm panel of epoxy composition cured in an aluminium mould. The epoxy composition was extruded in the mould of a SEMCO cartridge. The mould was cured in an air forced oven for 60 minutes at 125° C. with a heat-up rate of 3° C./min. The specimens were then tested in a flammability chamber to the 12-seconds and 60-seconds Vertical Burn Test. The burn length was recorded in mm. Three samples of each epoxy-based composition were tested and the results averaged.

Exothermicity 100 g of the precursor composition were filled into a stainless steel round bottom cup having a diameter of 100 mm and a height of 35 mm. An electrical thermocouple was placed in the center of the precursor. The precursor was then cured by placing it into a forced air oven and running a curing cycle where the oven temperature was raised from 23° C. to 175° C. using a heating rate of 2° C./min. Then the temperature was held at 175° C. for 1 hour. The peak exotherm was calculated by subtracting the oven heat from the maximum heat recorded by the thermocouple in the precursor composition, i.e. the maximum temperature recorded by the thermocouple minus 175° C.

Dynamic Mechanical Thermal Analysis (DMTA)

For DMTA testing a DMTA V Rheometer was used commercially available by Rheometric Scientific Inc., Piscataway, N.J. 08854, USA. For the preparation of test specimens the precursor was coated between 2 silicone release liners to a thickness of about 0.3 mm and cured in an air forced oven using a curing cycle from 23° C. to 175° C. at a heating rate of 2-5° C. minutes. Then the temperature was held at 175° C. for 1 hour, in order to completely cure the epoxy-based composition. After the curing for 1 hour at 175° C. was completed, the cured epoxy-based composition was cooled down to 23° C. over a period of 45 minutes.

Test specimens were then cut out having a dimension of 5 mm×10 mm and subjected to DMTA testing for the evaluation of the glass transition temperature (Tg). The DMTA settings were as follows:

Used Mode: Tensile mode (static force tracking dynamic force)
Orientation of the drive assembly: Horizontal
Temperature range of measurements: −50° C./+300° C.
Heating rate at: 2° C. per minute
Frequency measured at: 1 Hz
Strain at: 0.05%

Density

Samples of the epoxy-based composition were prepared by casting the corresponding precursors into moulds and curing in a forced air oven using a temperature program as described under the test method "Compressive Strength", as described previously. The cured samples of the epoxy-based composition were removed from the moulds and their exact dimensions recorded. Each sample was weighed and the density calculated and recorded in grams per cm$^3$.

| List of Materials | | |
|---|---|---|
| (1) | DEN 431 | Novolac epoxy resin, reaction product of phenol-formaldehydes novolac with epichlorohydrin, from Dow Chemical Company Ltd, West Drayton, UK |
| (2) | ERISYS GA-240 | Tetraglycidyl meta-xylenedimanine, from CVC Speciality Chemicals Inc., Moorestown, NJ, USA |
| (3) | METH/E | Methyl nadic anhydride, acid anhydride of methylnorbornene phthalate, from Lonza S.P.A, Scanzorosciate, Italy |
| (4) | ECA 100N | Methyltetrahydrophthalic anhydride from Dixie chemicals, Texas, US |
| (5) | Curezole 2MA-OK | Imidazole derivative, G. Grolman GmbH, Neuss, Germany |
| (6) | Ancamine 2441 | Cycloaliphatic amine, from Air Products, Allentown, PA, USA |
| (7) | Omnicure BC 120 | Boron trichloride amine complex, from CVC Speciality Chemicals Inc., Moorestown, NJ, USA |
| (8) | Ancamine 2337S | Aliphatic amine, from Air Products, Allentown, PA, USA |
| (9) | Exolit RP 6500 | Encapsulated red phosphorus, from Clariant, Frankfurt, Germany. |
| (10) | Space Rite S 11 | Aluminium trihydrate, from Alamtis GmbH, Frankfurt, Germany |
| (11) | Zinc Borate 467 | Smoke suppressant, from Great Lakes, Manchester, UK |
| (12) | Scotchlite D32/4500 | Hollow glass microspheres, effective top size 85 microns, from 3M Company, St. Paul, MN, U.S.A |
| (13) | Dicyandiamide CG 1200 | 1-cyanoguanidine, epoxy hardener, from Air Products, Allentown, PA, USA |

EXAMPLES

Example 1 and Comparative Examples 1-6

Epoxy-based compositions were prepared by combining in each case the compounds listed below in Table 1 in a 2.0 liter mechanical mogul type mixer commercially available by Linden GmbH, Germany. In Table 1, all concentrations are given as weight percent.

A temperature of less than 35° C. was maintained during the mixing process, using water-cooling. In a first step the epoxy resin was mixed at 20 to 40 rpm with the encapsulated red phosphorus, the aluminium trihydrate and the zinc borate for about 20 minutes until a homogeneous blend was achieved. Then the hardener system was added followed by mixing for an additional 15 minutes. Hollow glass microspheres were then stirred in followed by an additional mixing of 20 minutes.

As a final step the homogeneous blend was degassed by applying a 100 mbar vacuum for 5 minutes. The precursor formulations were stored −18° C.

The precursors were cured by subjecting them to the curing cycle from 23° C. to 125° C. as described in the test method section above, sub-section "Compressive strength".

All precursor formulations, except the formulation of comparative example C6, were pastes having a smooth and uniform consistence. The formulation of comparative example C6 was not extrudable and only the exothermicity was measured.

The extrusion rate of the uncured precursors and the compressive strength, optical smoke density, the vertical burn test and the DMTA measurements of the cured epoxy-based compositions were run as described previously in the test method section. The results of these measurements are summarized in Tables 2 and 3.

TABLE 1 ingredients of precursor compositions

| Component (wt %) | C 1 | C 2 | C 3 | C 4 | C 5 | C 6 | Ex 1 |
|---|---|---|---|---|---|---|---|
| DEN 431 (Novolac epoxy resin) | | 22.8 | 22.8 | 22.8 | 22.8 | 22.8 | 22.8 |
| ERISYS GA-240 (Tetraglycidyl meta-Xylenedimanine) | 22.8 | | | | | | |
| METH/E (anhydride of methylnorbornenephthalate) | | | 26 | | | | 26 |
| ECA 100NC (methyl tetrahydrophthalic anhydride) | 26 | 26 | | 26 | 26 | | |
| Curezol 2MA-OK (2,4-diamino-6-[2'-methyl imidazolyl-(1')]-ethyl-s-triazine isocyanuric acid adduct dihydrate, Mp = 260° C.) | | | | | 0.5 | | |
| Ancamine 2441 (cycloaliphatic amine, Mp of 121° C.) | 0.5 | 0.5 | 0.5 | | | 0.4 | 0.3 |
| Omnicure BC 120 (Boron trichloride amine complex) | | | | 0.5 | | | |
| Ancamine 2337S (aliphatic amine, Mp of 63-78° C.) | | | | | | | 0.2 |
| Dicyandiamide CG 1200 (Mp of 209-212° C.) | | | | | | 0.1 | |
| Scotchlite D32/4500 (glass microspheres) | 22 | 22 | 22 | 22 | 22 | 22 | 22 |
| Exolit RP 6500 (encapsulated red phosphorus) | 4.2 | 4.2 | 4.2 | 4.2 | 4.2 | 4.2 | 4.2 |
| Space Rite S 11, (aluminium trihydrate) | 20 | 20 | 20 | 20 | 20 | 20 | 20 |
| Zinc Borate | 4.5 | 4.5 | 4.5 | 4.5 | 4.5 | 4.5 | 4.5 |

TABLE 2

Properties of precursor compositions and cured compositions respectively

| Test | C 1 | C 2 | C 3 | C 4 | C 5 | C 6 | Ex 1 |
|---|---|---|---|---|---|---|---|
| DMTA (Tg) | — | 151 | 128 | 143 | 151 | — | 150 |
| DMTA (Onset) | — | 137 | 105 | 129 | 137 | — | 135 |
| Exothermicity (° C.) | — | 70 | 70 | 50 | 71 | 85 | 50 |
| Initial Extrusion Rate (g/min) | 100 | 100 | 88 | 180 | 90 | — | 110 |
| Extrusion rate after 3 days (g/min) | 5 | 72 | 45 | 85 | 15 | — | 80 |
| Extrusion rate after 5 days (g/min) | — | 60 | — | 70 | — | — | 65 |
| Compressive Strength at 20° C. (MPa) | — | 75 | — | — | — | — | 77 |
| Compressive Strength at 80° C. (MPa) | — | 60 | — | — | — | — | 55 |
| Compressive Strength at 120° C. (MPa) | — | 53 | 24 | 45 | 54 | — | 44 |
| Compressive Strength at 135° C. (MPa) | — | 45 | 19 | 23 | 38 | — | 40 |
| Compressive Strength at 150° C. (MPa) | — | 25 | — | — | — | — | 25 |
| Vertical Burn Test after 12 sec - Burn length (mm) | — | — | — | — | — | — | 25 |
| Vertical Burn Test after 60 sec - Burn length (mm) | — | — | — | — | — | — | 111 |
| Optical Smoke Density | — | — | — | — | — | — | 125 |
| Density (g/cm³) | | | | | | | 0.7 |

TABLE 3

Toxic gas emissions of the formulation of example 1 after submission to the emission test

| | HCN | CO | NOx | SO2 | HF | HCl |
|---|---|---|---|---|---|---|
| Gas emissions after burning [ppm] | 15 | 55 | <2 | <10 | <1 | <1 |

The invention claimed is:

1. A curable composition comprising
   (i) at least one epoxy resin comprising at least one aromatic moiety or a cyclic moiety derivable by hydrogenating an aromatic moiety and wherein the epoxy resin does not contain an aromatic amine moiety,
   (ii) an epoxide hardener system comprising
      (a) a carboxylic acid anhydride,
      (b) a first amine having a melting point from about 30° C. to about 100° C. and containing at least one primary amine group; and
      (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride;
   (iii) a filler capable of reducing the density of the curable composition and, optionally,
   (iv) a lire-retardant system that includes a mixture of:
      (a) at least one compound selected from the group comprising alkaline earth metal hydroxides and aluminium group hydroxides, and
      (b) at least one phosphorous-containing material.

2. The curable composition of claim 1 having an initial extrusion rate of from about 50 g/min to about 300 g/min when being extruded at a temperature of 25° C. and a pressure of 5 bar for 60 seconds through a circular aperture having a diameter of 6.35 mm.

3. The curable composition of claim 1 having an initial extrusion rate of from about 50 g/min to about 300 g/min and an extrusion rate of from about 50 g/min to about 300 g/min 3 days and 5 days after preparation when being extruded at a temperature of 25° C. and a pressure of 5 bar for 60 seconds through a circular aperture having a diameter of 6.35 mm.

4. The curable composition of claim 1 having an exothermicity of less than 60° C.

5. The curable composition of claim 1 having an exothermicity of less than 60° C.; a compressive strength after curing of at least 60 MPa at 23° C. of at least 35 MPa at 135° C., and of at least 20 MPa at 150° C.

6. The curable composition of claim 1 wherein the organic epoxide is essentially halogen-free.

7. The curable composition of claim 1 wherein the epoxy resin contains repeating units derived from monohydric, dihydric or trihydric phenols which may be non-substituted or alkyl substituted and further comprises glycidyl ether moieties.

8. The curable composition of claim 1 wherein the epoxy resin is a novolac resin.

9. The curable composition of claim 1 wherein the filler capable of reducing the weight of the composition comprises inorganic hollow particles.

10. The curable composition of claim 1 containing 10 to 70% by weight of the epoxy resin, 1 to 55% by weight of the epoxide hardener system, 10 to 60% by weight of the filler capable of reducing the weight of the composition and, if present, 5 to 50% by weight of the fire retardant system, wherein the percentages by weight are based on the total amount of the composition and the total amount of weight percentages gives 100%.

11. A cured composition comprising;
(i) the reaction product of an epoxy resin and an epoxide hardener system, where the epoxy resin comprises at least one aromatic moiety or a cyclic moiety derivable by hydrogenating an aromatic moiety and wherein the epoxy resin does not contain an aromatic amine moiety, and wherein the epoxide hardener system comprises
   (a) a carboxylic acid anhydride,
   (b) a first amine having a melting point from about 30° C. to about 100° C. and containing at least one primary amine group; and
   (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride;
and wherein the composition further comprises:
(ii) a filler capable of reducing the density of the curable composition and, optionally,
(iii) a fire-retardant system that includes a mixture of:
   (a) at least one compound selected from the group comprising alkaline earth metal hydroxides and aluminium group hydroxides, and
   (b) at least one phosphorous-containing material.

12. The composition of claim 11 having a compressive strength of at least 60 MPa at 23° C., of at least 35 MPa at 135° C., and of at least 20 MPa at 150° C.

13. The composition of claim 11 having a density of less than 0.9 g/cm$^3$.

14. A process for filling cells of a honeycomb structure comprising applying a curable composition according claim 1 to the honeycomb structure, curing the composition.

* * * * *

UNITED STATES PATENT AND TRADEMARK OFFICE
CERTIFICATE OF CORRECTION

PATENT NO. : 8,779,032 B2
APPLICATION NO. : 13/258665
DATED : July 15, 2014
INVENTOR(S) : Sohaib Elgimiabi It is certified that error appears in the above-identified patent and that said Letters Patent is hereby corrected as shown below:

In the specification

Column 4
Line 42, delete "epichlorohydrine" and insert -- epichlorohydrin --, therefor.
Lines 57-58, delete "dinaphrhylmethane," and insert -- dinaphthylmethane, --, therefor.
Line 63, delete "dihydroxydiphenylpropylenphenylmethane," and insert
    -- dihydroxydiphenylpropylenephenylmethane, --, therefor.

Column 5
Line 15, delete "trihyidric" and insert -- trihydric --, therefor.
Line 24, delete "mPa s" and insert -- mPa·s --, therefor.
Line 25, delete "mPa s" and insert -- mPa·s --, therefor.
Line 50, delete "mPa s" and insert -- mPa·s --, therefor.
Line 52, delete "mPa s" and insert -- mPa·s --, therefor.
Line 54, delete "mPa s" and insert -- mPa·s --, therefor.

Column 6
Line 11, Delete "(2 methylimidazolyl)" and insert -- (2-methylimidazolyl) --, therefor.

Column 13
Line 56, delete "xylenedimanine," and insert -- xylenediamine, --, therefor.

Column 14
Line 14, delete "Alamtis" and insert -- Almatis --, therefor.

Column 15
Line 7, delete "Xylenedimanine)" and insert -- Xylenediamine) --, therefor.

Signed and Sealed this
Nineteenth Day of April, 2016

Michelle K. Lee
*Director of the United States Patent and Trademark Office*

CERTIFICATE OF CORRECTION (continued)
U.S. Pat. No. 8,779,032 B2

In the claims

Column 16
Line 61, in Claim 1, delete "lire" and insert -- fire --, therefor.

Column 17
Line 14, in claim 5, delete "23° C." and insert -- 23° C., --, therefor.

Column 18
Line 1, in Claim 11, delete "comprising;" and insert -- comprising: --, therefor.
Line 33, in Claim 14, delete "according claim" and insert -- according to claim --, therefor.